July 18, 1967  A. A. MORAN  3,331,609
ROTARY FLUID SEAL
Filed April 7, 1965  3 Sheets-Sheet 1
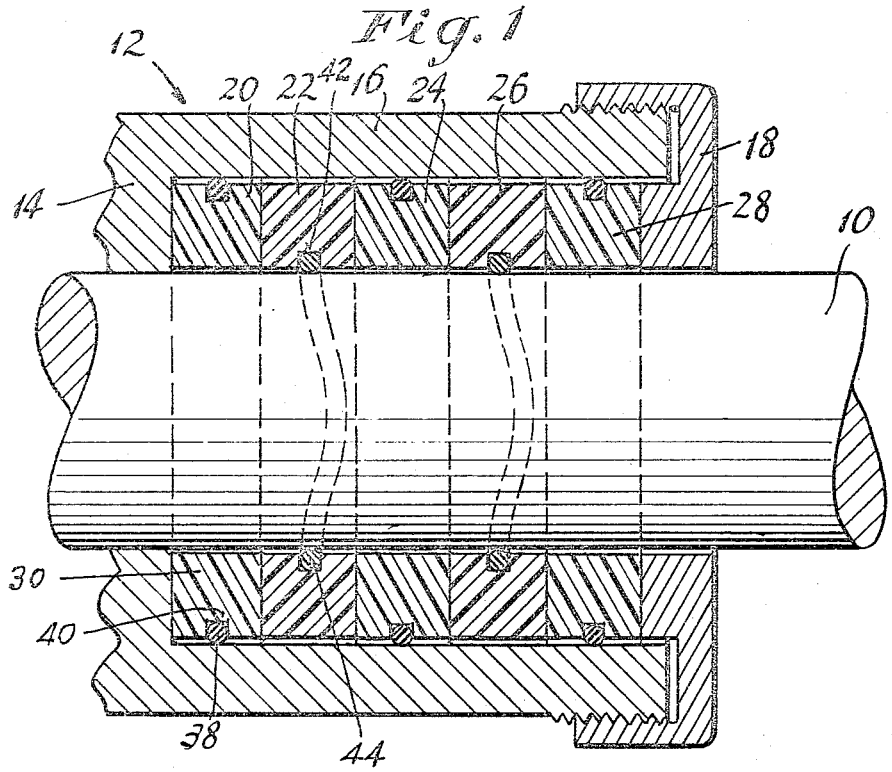
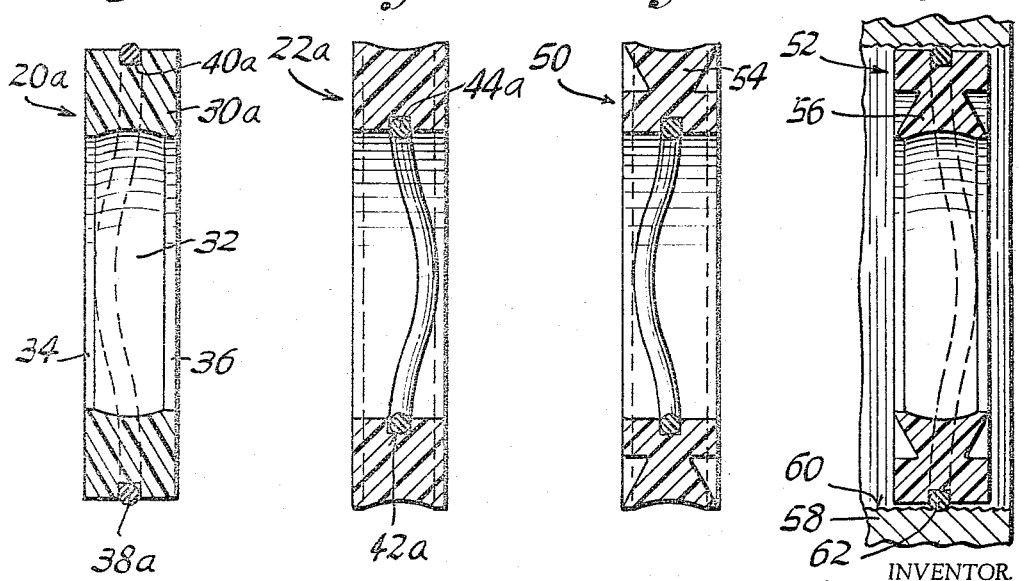
INVENTOR.
Archibald A. Moran
BY
AGENT

United States Patent Office 3,331,609
Patented July 18, 1967

3,331,609
ROTARY FLUID SEAL
Archibald A. Moran, Woodbury, Conn., assignor of one-half to Edwin W. Plumb, Woodbury, Conn.
Filed Apr. 7, 1965, Ser. No. 446,192
17 Claims. (Cl. 277—84)

This invention relates to rotary fluid seals for shafts and the like, and more particularly to seals of this type which involve annular or ring-like parts.

Where rotating shafts and similar parts, which are carried in bearings or housing structures, are to be sealed against loss of lubricant or other liquid, sealing or packing devices, stuffing boxes and the like are commonly required. In the case of simple seals involving an annulus or ring, the sealing element or surface which engages the rotating part is normally held against rotation. Or, if the seal is to be against a stationary part, the sealing annulus is made to turn with the rotating part. In either circumstance, it is important to maintain either a given stationary or rotating condition of the seal as the conditions may require in order to establish the correct relationship between the sealing element and the cooperable surface. If the proper stationary or movable condition of the seal is not maintained a deterioriation results, whereby the seal eventually breaks down and loses its effectiveness.

The present invention obviates drawbacks of prior sealing elements wherein complicated, costly or cumbersome means are provided to prevent turning of the sealing elements or to maintain the required rotary condition of such element, and one object of the invention is to provide a novel and improved, simple sealing annulus and associated sealing element, by which a required stationary or movable condition of the sealing means is effectively maintained at all times, minimizing the likelihood of failure of the seal.

Another object of the invention is to provide an improved sealing device as above set forth wherein relatively few parts are involved, and wherein the control of movement of the sealing means is incorporated in the seal itself, as distinguished from external or additional retainer or detent means heretofore required.

In effecting the above simplified seal and movement control means, the invention provides in conjunction with a shaft part and a housing part, a sealing annulus which surrounds the shaft part and is engageable with the housing part, and also a resilient sealing strip which is carried by the annulus and maintained thereby in pressing contact with one of said parts, said strip having portions extending transversely of the direction of relative movement of the parts whereby said portions are at least partially broadside to such movement, thereby to effect an increased restraint on the annulus against turning with respect to the said one part.

In the illustrated embodiments of the invention the sealing annulus is fabricated of plastic substance which is impregnated with graphite, said annulus having a groove in either its outer or inner peripheral portion, in which a resilient O-ring is carried. The groove and the O-ring have a transverse disposition with respect to the direction of relative movement of the parts, either by providing these with a serpentine shape or else by having the groove and resilient element of elliptical shape or other configuration to provide the desired broadside disposition of at least part of the sealing element.

A feature of the invention resides in the provision of an improved rotary seal as above characterized, wherein but two separate parts are involved in the simplest illustrated construction, such few parts still resulting in an effective control of the movement of the seal.

An additional object of the invention is to provide an improved multiple-unit or labyrinth seal for a rotating shaft structure, characterized by alternate rotating and non-rotating annuli having the improved movement control means of the invention.

Other features of the invention reside in the simplicity, small size and compactness, and low fabricating cost of the rotary seal.

Further features and advantages will hereinafter appear.

In the drawings accompanying this specification, similar charcters of reference are used to designate like components throughout the several views, in which:

FIG. 1 is a diametric sectional view through a shaft and housing assemblage having a multi-unit, improved labyrinth type rotary seal device as provided by the invention.

FIG. 2 is a diametric section of a single annular rotary sealing unit made in accordance with the invention, for use as a single seal.

FIG. 3 is a diametric section of another rotary sealing unit as provided by the invention, illustrating another single seal embodiment thereof.

FIG. 4 is a diametric section somewhat like that of FIG. 3, but illustrating yet another modification of the invention.

FIG. 5 is a diametric section of a sealing device somewhat similar to that of FIG. 2, but illustrating still another modification of the invention.

Figure 6:
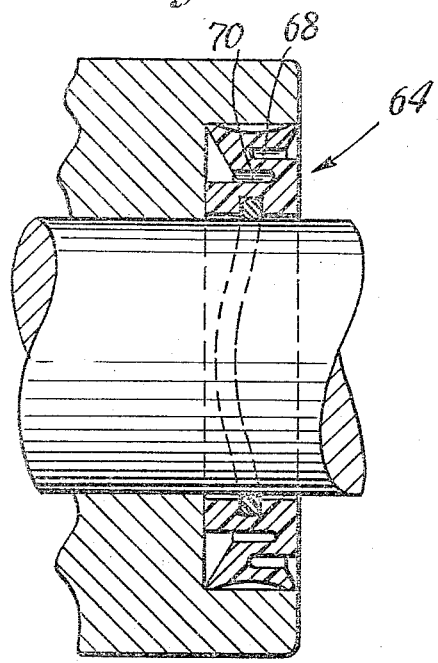
FIG. 6 is a diametric section of a sealing device along the lines of those of FIGS. 3 and 4, illustrating a further modification of the invention.

Referring first to FIG. 1 there is illustrated a shaft member or part 10 which extends through a housing or bearing part 12, the latter having a bearing portion 14 which is engageable with the shaft 10, and having a sealing portion 16 surrounding the shaft and spaced therefrom. Threaded on the sealing portion 16 is an end cap 18 which constitutes a retainer for a plurality of loosely stacked annular sealing units of unique and unusual construction, comprising in combination a novel and improved labyrinth-type seal.

The sealing units are shown as being five in number, having the reference numerals 20, 22, 24, 26 and 28. The annuli 20, 24 and 28 are identical to each other, as are the annuli 22 and 26. Accordingly, a detailed description of only one of each type of sealing annulus will be given.

The sealing annulus 20 is of ring-like configuration, comprising a circular body portion 30 which may advantageously be of a graphite-filled substance, such as a plastic material permeated with graphite. Substances known commercially by the trademarks "Penton," "Teflon," etc., may be utilized in producing the body 30.

In accordance with the invention, novel means are provided for preventing turning of the sealing members 20, 24 and 28 as the shaft 10 is rotated with respect to the housing or bearing 14, 16. Considering the member 20, such means comprises a resilient sealing strip 38 which is carried by the member and maintained thereby in pressing contact with the housing part 16, the strip 38 having portions which extend transversely of the direction of relative movement of the parts 10, 12 whereby said strip portions are at least partially broadside to such direction of movement. By this organization the sealing strip 38 effects a restraint on the annulus 20 against turning with respect to the housing and bearing part 14, 16.

The resilient sealing strip 38 is constituted of relatively soft rubber, having a ring-like configuration and a serpentine shape whereby it has reverse bends, said strip being carried in a similar-shaped groove 40 in the outer periphery of the annulus 20. I have found that a serpentine shape or the disposing of strip portions which extend transversely of the direction of relative movement of the parts 10, 12, provides a greater restraint on the sealing annulus 20 and prevents the latter from turning to a greater extent than if the sealing strip 38 were to be perfectly circular (as if it were constituted of a portion of a cylinder). If the groove 40 and the sealing strip 38 were to be of such perfectly circular shape the restraint against turning imposed on the annulus 20 would be appreciably less than the restraint imposed by making the groove and strip 40, 38 of serpentine or other configuration and disposition as provided by the present invention.

As seen in FIG. 1, when the sealing ring 20 is in its operative position, the circular-section strip 38 (which is also commonly termed an "O-ring") will be somewhat flattened by moderate pressures existing between said strip and the inner surface of the housing 16.

Instead of disposing the sealing strip 38 in the outer peripheral portion of the annulus, in the case of the members 22, 26 the sealing strip is disposed in the inner peripheral portions. Hence the annulus 22 has a serpentine groove 42 disposed at its inside, in which there is carried the serpentine-shaped resilient sealing strip 44. The action of the serpentine sealing strip is similar, except that now the sealing annulus 22 will rotate with the shaft 10, instead of remaining stationary with the housing 16 as was the case with the sealing annulus 20. In a like manner, in FIG. 1 the remaining annuli 24, 28 will remain stationary in the housing 16 whereas the annulus 26 will rotate with the shaft 10.

Thus, in FIG. 1 the small-section O-rings cause turning of the annuli 22, 26 and prevent turning of the annuli 20, 24 and 26. The engagement between the end faces of the five annuli, in conjunction with the sealing action of the five O-rings 38, 44 and the detaining or movement-control function of such O-rings results in a labyrinth effect characterized by a tortuous path, which is most advantageous in preventing leakage of fluid past the shaft 10 while at the same time insuring long useful life of the seal. Any fluid seeping past the sliding end faces of the annuli is required to take radially outward and inward directions, in following such tortuous path, thus resulting in an effective sealing action.

Novel individual movement-controlled seals are shown in FIGS. 2 and 3. The annuli 20a and 22a, having the grooves 40a, 42a and O-rings 38a, 44a differ from the previous seals in having concave peripheral portions. The annulus 20a has at its inner periphery 32 end ribs 34, 36 adapted to forcibly engage a shaft and to flatten slightly whereby a good seal is effected with a minimum of frictional drag or pull. Fluid is trapped in the concavity between the ribs, and the seals of FIGS. 2 and 3 are thus effective as single units, usable separately or alone.

FIGS. 4 and 5 disclose sealing annuli 50, 52 wherein respectively the outer and inner peripheral portions are generally of V-shaped cross section. In FIG. 4, the outer peripheral portion 54 is of such general cross section, and in FIG. 5 the inner peripheral portion 56 is of such general cross section.

These configurations provide a greater yieldability of the sealing annuli, and enable easier insertion or placement of the sealing means to be effected while providing a better sealing contact with less likelihood of leakage.

In FIG. 5 a housing portion 58 is illustrated, having an inner peripheral surface 60 of slightly ribbed configuration. The ribbed configuration of the surface 60 is exaggerated for purposes of convenience of illustration, and may be the natural result of boring the housing 58 in a lathe, using a boring bar and cutting tool, whereby slight surface irregularities exist, comprising circular ribs and grooves which normally appear to be a smooth surface but actually are seen when the surface is greatly enlarged or magnified. Such ribs and grooves, extending in the direction of relative movement of the shaft and housing parts, react with the transverse disposition of the sealing strip or ring 62 to effect an additional restraint on the annulus 52 for preventing turning of the latter.

Figure 7:
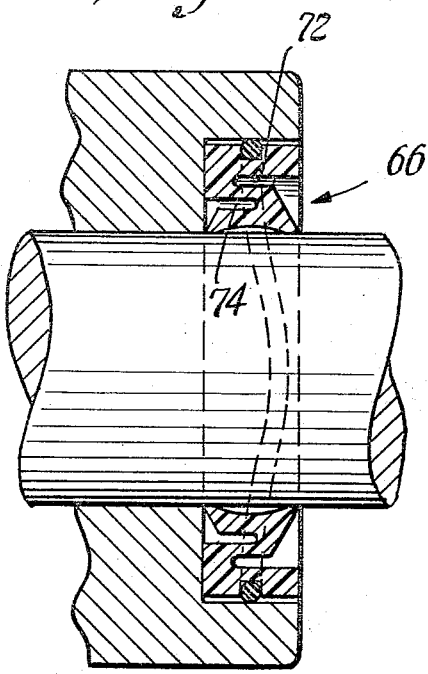
FIG. 7 is a diametric section of a sealing device along the lines of FIGS. 2 and 5, illustrating a still further embodiment or variation of the invention.

In FIGS. 6 and 7 the sealing annuli 64, 66 have deep annular grooves of different diameters disposed in their opposite sides. The annulus 64 has side grooves 68, 70 whereas the annulus 66 has side grooves 72, 74. By such construction an additional flexibility and yieldability of the annuli is had, enabling these to conform readily to normal surface irregularities of the cooperable parts, resulting in a better seal and at the same time enabling the annuli to be easily inserted in their operative positions.

Figure 8:
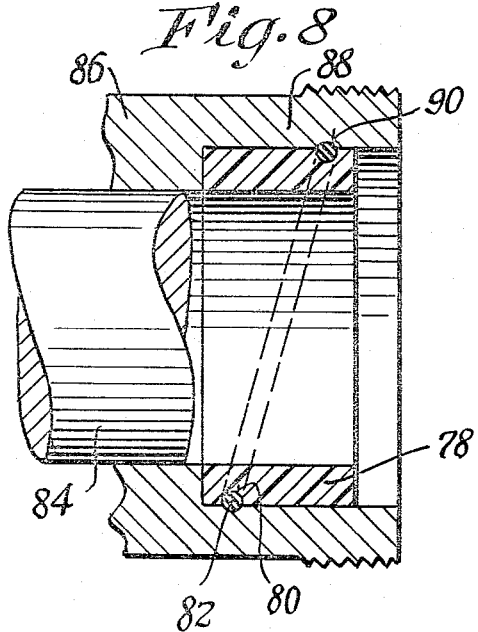
FIG. 8 is a diametric section of a sealing device made in accordance with the invention, showing still another modification.

Still another embodiment of the invention is illustrated in FIG. 8. In this construction the sealing annulus 78 has a transversely extending groove 80 in its outer periphery, said groove being of true elliptical shape, as effected when a flat plane cuts a perfectly cylindrical surface. Disposed in the groove 80 is a resilient sealing strip or O-ring 82 the disposition of which is such that it has substantially all of its portions extending transversely of the direction of relative movement of the shaft 84 with respect to the bearing-housing 86, 88. Further, the housing portion 88 is provided with a shallow groove 90 of elliptical configuration, conforming in its disposition to the groove 80 in the sealing annulus 78. The sealing O-ring 82 is disposed in the two grooves 80, 90, providing an interlocking action which effectively prevents turning of the sealing annulus 78 in the housing portion 88.

It will now be seen from the foregoing that I have provided a novel and improved, simple rotary sealing annulus and O-ring construction by which the annulus is effectively restrained and prevented from turning with respect to one part that engages it.

The restraining tendency of the serpentine or diagonally disposed O-rings is made more effective when such rings are subjected to higher than normal compressive forces. Such compressive forces may be a result of the the O-ring being made in an oversize, or by other suitable modifications of the dimensions of the parts associated with the O-ring. In another embodiment of the invention, described below, there is revealed a means for effecting an increased force exerted on the serpentine O-ring, if the O-ring is of conventional size and diameter or thickness.

Figure 9:
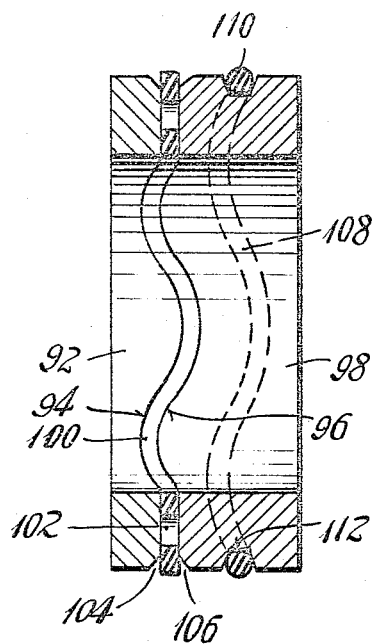
FIG. 9 is a diametric section of a sealing ring representing still another embodiment, wherein canting of the sealing element increases the force which it exerts.

An embodiment of the invention by which side-directed forces on the O-ring will result in an increased restraint, is illustrated in FIG. 9. There is shown here an annulus 92 having a serpentine edge 94, which is cooperable with a mating serpentine edge 96 of an annulus 98. Disposed between the annuli 92, 98 is a flat rubber or plastic sealing washer or ring 100, which is preferably provided with a plurality of suction perforations 102 disposed in a circle. The facing serpentine edges are provided with generous chamfers or bevels 104, 106, providing space at both sides of the sealing ring 100. The annuli 92, 98 are forced toward each other and against the sealing ring 100 by suitable members or elements (not shown). The annulus 98 also has a serpentine groove 108 in which there is disposed a rubber or plastic O-ring 110 having a rounded outer periphery and a flatted inner periphery, the latter being indicated at 112. The serpentine groove 108 has divergent side walls. With such construction any sidewise forces on the rings 100, 110 will tend to cant them due to the clearance provided on each of their sides. When either the ring 100 or the ring 110 cants slightly, the non-circular cross section of the ring will cause increased pressures to exist. In the case of the ring 100 the outer corners will raise, so to speak, and in the case of the ring 110 the inner corners will tend to raise or enlarge the ring itself, when sidewise forces are exerted. Such increased forces will thus tend to restrain turning of the rings and the annuli 92, 98.

Figure 10:
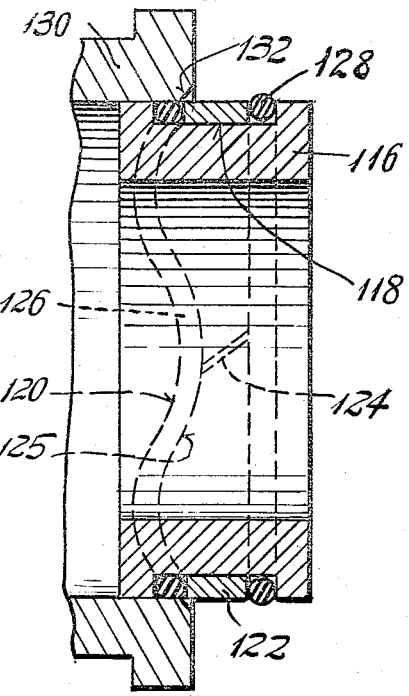
FIG. 10 is a diametric section of yet another embodiment, wherein means are provided for increasing the force exerted by the sealing element.

In FIG. 10 another embodiment of the invention is illustrated, wherein additional stressing of the serpentine O-ring is effected beyond that normally attainable by the usual insertion procedure of the sealing device. An annulus 116 is shown, having a wide and shallow groove 118, one edge 120 of which groove has a serpentine configuration. Carried in the groove 118 is a spacer ring 122, which may have ends 124 as indicated. The split ring 122 has a serpentine edge 125 conforming in shape to the serpentine edge 120 of the groove 118. On opposite sides of the split ring 122 are rubber O-rings 126, 128, the latter being perfectly circular or flat whereas the ring 126 has a serpentine shape conforming to the edges of the ring 122 and groove 118. The housing part for the assemblage is indicated at 130.

Operation is as follows: When the assemblage is first being inserted, as illustrated in FIG. 10, a normal compression of the serpentine O-ring 126 occurs. As the insertion of the assemblage proceeds, engagement will occur between the O-ring 128 and the housing 130, and due to the circular or flat nature of the O-ring 128 this may be of larger diameter or thickness, and may experience a much greater compression upon its insertion in the housing 130. A chamfered edge 132 on the housing 130 facilitates the insertion and greater compression of the flat O-ring 128. Such greater compression now shifts the split ring 122 from right to left, thereby effecting a greater compression of the serpentine O-ring 126. In consequence of such greater compression, increased forces exist on the serpentine O-ring, resulting in a greater restraint effect of the latter.

It will be understood that the rings of FIGS. 9 and 10, as well as the rings of FIGS. 2 through 8 may be incorporated in a combination or combined seal of the type shown in FIG. 1.

The various embodiments of the invention may be economically fabricated, and constitute an advantageous rotary sealing construction which makes for maximum reliability, insurance against leakage, and useful life.

Variations and modifications may be made within the scope of the claims, and portions of the improvement may be used without others.

I claim:
1. A rotary seal comprising, in combination:
   (a) a shaft part and a housing part surrounding said shaft part, one of said parts being turnable with respect to the other part, wherein said parts are in spaced relationship,
   (b) a sealing annulus disposed in the space between said parts and having a continuous groove in a peripheral surface facing one of said parts,
   (c) a resilient sealing ring seated in said groove and maintained in pressing contact with said one part, said ring having portions extending back and forth axially so that said portions are at least partially broadside to the direction of relative movement of the parts, thereby to effect an increased restraint on said annulus against turning with respect to said one part.
2. A rotary seal as defined in claim 1, wherein:
   (a) the ring is disposed in the outer periphery of the annulus and is engaged with the housing part.
3. A rotary seal as defined in claim 2, wherein:
   (a) said annulus has an inner peripheral portion of generally V-shaped cross section.
4. A rotary seal as defined in claim 3, wherein:
   (a) said annulus has deep annular grooves of different diameters disposed in its opposite sides.
5. A rotary seal as defined in claim 1, wherein:
   (a) the ring is disposed in the inner periphery of the annulus and is engaged with the shaft part.
6. A rotary seal as defined in claim 5, wherein:
   (a) said annulus has an outer peripheral portion of generally V-shaped cross section.
7. A rotary seal as defined in claim 6, wherein:
   (a) said annulus has deep annular grooves of different diameters disposed in its opposite sides.
8. A rotary seal as defined in claim 1, wherein:
   (a) the said ring is substantially circular and disposed in a plane making an acute angle to the axis of the shaft.
9. A rotary seal as defined in claim 8, wherein:
   (a) the said other part has a shallow substantially circular groove in which a portion of the ring is received.
10. A rotary seal as defined in claim 1, wherein:
    (a) the said groove and ring have a serpentine configuration with reverse bends.
11. A rotary seal as defined in claim 1, wherein:
    (a) a second annulus is provided surrounding the shaft part and in the space between the same and the housing part, said second annulus being disposed alongside the first-mentioned annulus,
    (b) said second annulus having a groove in its inner peripheral portion and a resilient sealing ring in said groove,
    (c) said ring of the second annulus having portions extending back and forth axially so that said portions are at least partially broadside to the direction of relative movement of the parts,
    (d) the groove of the first-mentioned annulus being disposed in the outer peripheral portion thereof.
12. A rotary seal comprising, in combination:
    (a) a shaft part and a housing part surrounding and spaced from said shaft part, one of said parts being turnable with respect to the other part,
    (b) a plurality of sealing annuli surrounding the shaft and disposed in said housing in end-to-end contacting relation in the space between the parts,
    (c) alternate annuli having continuous grooves and resilient sealing rings occupying said grooves in thier outer peripheral portions, said rings being engaged with said housing,
    (d) the remaining annuli having continuous grooves and resilient sealing rings occupying said grooves in their inner peripheral portions, said inner rings being engaged with said shaft,
    (e) said sealing rings having portions extending back and forth axially so that said portions are at least partially broadside to the direction of relative movement of the parts, thereby to effect an increasd restraint on the respective annuli against turning with respect to the parts engaged by the sealing rings.
13. A rotary seal as defined in claim 1, wherein:
    (a) operable means are provided, for applying lateral forces to the sealing strip to increase the contact pressure between the strip and said one part.
14. A rotary seal as defined in claim 13, wherein:
    (a) the said operable means comprises a member movably carried by the sealing annulus, and engaged with said strip, and
    (b) means on the annulus, engaged with said member to apply a shifting force thereto to move the member toward the sealing strip.
15. A rotary seal as defined in claim 14, wherein:
    (a) the means for applying a shifting force to the said member comprises a second sealing strip carried by the annulus,
    (b) said sealing strips and member being of ring-shaped configuration.
16. A rotary seal as defined in claim 1, wherein:
    (a) the sealing annulus comprises two rings having similarly shaped adjoining end surfacs of serpentine configuration,
(b) said sealing strip comprising a flat ring disposed between the said end surfaces and conforming to the shapes thereof.

17. A rotary seal as in claim 1, wherein:
(a) the said groove has divergent side walls,
(b) said sealing ring having a non-circular cross-sectional shape and being so disposed in the groove that canting of the ring increases the force exerted by the same against the said one part.

References Cited

UNITED STATES PATENTS

| | | | |
|---|---|---|---|
| 2,490,566 | 12/1949 | Wishart | 277—123 X |
| 2,571,500 | 10/1951 | Trevaskis | 277—32 |
| 3,288,475 | 11/1966 | Benoit | 277—206 X |

FOREIGN PATENTS 903,878  2/1954  Germany.

LAVERNE D. GEIGER, *Primary Examiner.*

J. S. MEDNICK, *Assistant Examiner.*